US012672153B2

(12) United States Patent
Xiao et al.

(10) Patent No.: US 12,672,153 B2
(45) Date of Patent: Jun. 30, 2026

(54) SYSTEMS AND METHODS FOR DCI FIELD SIZE ALIGNED IN CC GROUP

(71) Applicant: ZTE CORPORATION, Shenzhen (CN)

(72) Inventors: Kai Xiao, Shenzhen (CN); Xianghui Han, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 302 days.

(21) Appl. No.: 18/521,972

(22) Filed: Nov. 28, 2023

(65) Prior Publication Data

US 2024/0147495 A1     May 2, 2024

Related U.S. Application Data

(63) Continuation of application No. PCT/CN2022/080285, filed on Mar. 11, 2022.

(51) Int. Cl.
*H04W 72/232*          (2023.01)
*H04L 5/00*            (2006.01)

(52) U.S. Cl.
CPC ........... *H04W 72/232* (2023.01); *H04L 5/001* (2013.01)

(58) Field of Classification Search
CPC ....... H04W 76/16; H04W 76/34; H04W 8/14; H04W 8/20; H04W 24/02; H04W 24/04; H04W 76/15; H04W 76/25; H04W 8/205; H04W 88/06; H04W 16/32; H04W 72/0457; H04W 76/20; H04W 72/232; H04W 72/12; H04L 5/001; H04L 5/00

See application file for complete search history.

(56) References Cited

U.S. PATENT DOCUMENTS

| | | | | |
|---|---|---|---|---|
| 11,985,643 B2 * | 5/2024 | Takeda | ..................... | H04L 5/001 |
| 2016/0270063 A1 * | 9/2016 | Chen | ..................... | H04L 5/0053 |
| 2020/0029317 A1 * | 1/2020 | Nam | ..................... | H04L 5/0098 |
| 2021/0321440 A1 * | 10/2021 | Takeda | ................ | H04W 72/535 |
| 2022/0182938 A1 * | 6/2022 | Ye | .......................... | H04W 76/28 |

(Continued)

FOREIGN PATENT DOCUMENTS

| | | |
|---|---|---|
| CN | 112425109 A | 2/2021 |
| CN | 113708899 A | 11/2021 |

(Continued)

OTHER PUBLICATIONS

CATT, "Discussion on cross-carrier scheduling with different numerologies", 3GPP TSG RAN WG1 Meeting #97, R1-1906311, May 17, 2019, Reno, USA (4 pages).

(Continued)

*Primary Examiner* — Nathan S Taylor
(74) *Attorney, Agent, or Firm* — Foley & Lardner LLP

(57)          ABSTRACT

Presented are systems and methods for model management. A wireless communication node can determine a configured set of at least one field of a downlink control information (DCI) signaling, that is to be shared by a plurality of transmissions, the plurality of transmissions scheduled by the DCI signaling on a plurality of component carriers (CCs). The wireless communication node can send an indication of one or more fields from the configured set to a wireless communication device via a dynamic signaling.

20 Claims, 3 Drawing Sheets

300

(56) References Cited

U.S. PATENT DOCUMENTS

| | | | | |
|---|---|---|---|---|
| 2023/0083549 A1* | 3/2023 | Li | H04L 5/0098 | |
| | | | | 370/329 |
| 2023/0134938 A1* | 5/2023 | Wang | H04W 72/232 | |
| | | | | 370/329 |
| 2023/0163917 A1* | 5/2023 | Wang | H04L 5/0051 | |
| | | | | 370/329 |
| 2023/0171061 A1* | 6/2023 | Yuan | H04L 5/001 | |
| | | | | 370/329 |
| 2023/0283445 A1* | 9/2023 | Saber | H04L 5/0091 | |
| 2023/0389026 A1* | 11/2023 | Salah | H04W 72/02 | |
| 2025/0039899 A1* | 1/2025 | Huang | H04L 5/0048 | |
| 2025/0294581 A1* | 9/2025 | Ahn | H04W 72/232 | |

FOREIGN PATENT DOCUMENTS

| | | | | |
|---|---|---|---|---|
| EP | 3902359 A1 * | 10/2021 | H04W 72/23 | |
| WO | WO-2021/208904 A1 | 10/2021 | | |

OTHER PUBLICATIONS

International Search Report and Written Opinion for PCT Appl. No. , mailed on Nov. 25, 2022 (6 pages).

* cited by examiner

SYSTEMS AND METHODS FOR DCI FIELD SIZE ALIGNED IN CC GROUP

CROSS-REFERENCE TO RELATED APPLICATION

This application claims the benefit of priority under 35 U.S.C. § 120 as a continuation of PCT Patent Application No. PCT/CN2022/080285, filed on Mar. 11, 2022, the disclosure of which is incorporated herein by reference in its entirety.

TECHNICAL FIELD

The disclosure relates generally to wireless communications, including but not limited to systems and methods for DCI field size aligned in CC group.

BACKGROUND

In the 5th Generation (5G) New Radio (NR) mobile networks, a user equipment (UE) can send data to a base station (BS) by obtaining uplink synchronization and downlink synchronization with the BS. The BS can use a certain type of signaling to configure the UE for uplink and/or downlink transmission, such as downlink control information (DCI).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication node (e.g., gNB or base station (BS)) can determine a configured set of at least one field of a downlink control information (DCI) signaling, that is to be shared by a plurality of transmissions, the plurality of transmissions scheduled by the DCI signaling on a plurality of component carriers (CCs). The wireless communication node can send an indication of one or more fields from the configured set to a wireless communication device (e.g., user equipment (UE)) via a dynamic signaling.

In some implementations, the configured set can be configured by the wireless communication node, or may be predefined by a specification. In some implementations, the wireless communication node can send a radio resource control (RRC) signaling identifying the configured set of at least one field of the DCI signaling to the wireless communication device. In some implementations, the dynamic signaling can comprise a medium access control control element (MAC CE) signaling or another DCI signaling.

In some implementations, the plurality of CCs can be configured by the wireless communication node, or may be predefined by a specification. In some implementations, at least one of: the wireless communication node can send a radio resource control (RRC) signaling identifying the plurality of CCs to the wireless communication device; and/or the wireless communication node can send a dynamic signaling to indicate one or more of the plurality of CCs to the wireless communication device. In some implementations, the plurality of CCs can be divided into at least one CC group. At least one of: the wireless communication node can send a radio resource control (RRC) signaling to configure CCs in each of the at least one CC group to the wireless communication device; and/or the wireless communication node can send a dynamic signaling to indicate the CCs in each of the at least one CC group to the wireless communication device.

In some implementations, at least one of: the plurality of CCs can be divided into at least one CC group, at least one anchor CC can be configured in each of the at least one CC group, a first DCI field of a first anchor CC can be sharable by more than one CC in a CC group of the first anchor CC, or transmissions in the CCs of the CC group of the first anchor CC can be scheduled based on the first DCI field of the first anchor CC. In some implementations, a CC in a CC group can share a DCI field of more than one anchor CC of the CC group. a CC in a CC group can share a DCI field having a largest size among DCI fields of one or more anchor CCs of the CC group. In some implementations, a CC in a CC group can share a DCI field having a largest size among DCI fields of CCs of the CC group.

In some implementations, at least one of: a respective DCI field in the DCI signaling, configured for each of the at least one CC group, can be independently configured by the wireless communication node, or all CCs in a CC group of the at least one CC group can share a set of DCI fields that is sharable by more than one transmission. In some implementations, at least one of: a primary anchor CC can be configured by the wireless communication node for all of the at least one CC groups, a secondary anchor CC can be configured in each of the at least one CC groups, a respective DCI field in the DCI signaling, configured for each of the at least one CC group, can be independently configured by the wireless communication node, a DCI field of a secondary anchor CC can be sharable by more than one CC in a CC group of the secondary anchor CC, transmissions in the CCs of the CC group of the secondary anchor CC can be scheduled based on the DCI field of the secondary anchor CC, or a DCI field of the primary anchor CC can be sharable by more than one CC in a CC group of the primary anchor CC.

At least one aspect is directed to a system, method, apparatus, or a computer-readable medium. A wireless communication device (e.g., UE) can receive an indication of one or more fields from a configured set from a wireless communication node. The configured set can include at least one field of a downlink control information (DCI) signaling, that is to be shared by a plurality of transmissions, the plurality of transmissions scheduled by the DCI signaling on a plurality of component carriers (CCs).

The systems and methods presented herein include a novel approach for scheduling multiple transmissions on multiple CCs via a single DCI. Specifically, the systems and methods presented herein can include one DCI that schedules multiple transmissions on multiple CCs. For example, at least one DCI field of the DCI can be shared for more than one transmission. The DCI field can be predefined/preconfigured by a specification or default configuration, configured by an RRC signaling, or indicated by dynamic signaling. The CCs scheduled by the DCI can be predefined by a specification, configured by an RRC signaling, or indicated by dynamic signaling.

In various implementations, one or more CCs can be divided into at least one CC group. Individual CCs contained with a respective CC group can be configured by the RRC signaling or indicated by the dynamic signaling. At least one anchor (e.g., representative) CC can be configured in each CC group. The DCI field configured for the anchor CC in the DCI can be independently configured by a base station (BS) (e.g., wireless communication node or gNB). The DCI field of an anchor CC can be shared for more than one CC in the CC group of the anchor CC, thereby allowing the transmissions in these CCs to be scheduled based on the DCI field of the anchor CC.

In some implementations, one or more CCs in a CC group can share the DCI field of more than one anchor CC. A CC in a CC group can share the DCI field with a maximum size (e.g., DCI field of a CC with the highest number of bits). In some cases, at least one DCI field having the largest size in a CC group can be configured by a BS for an anchor CC.

In certain implementations, one or more CCs can be divided into at least one CC group. Individual CCs contained with a respective CC group can be configured by the RRC signaling or indicated by the dynamic signaling. The DCI field configured for each CC group in the DCI can be independently configured by the BS. All CCs in a CC group may share a set of DCI fields that can be shared for more than one transmission.

In various embodiments, one or more CCs can be divided into at least one CC group. Individual CCs contained with a respective CC group can be configured by the RRC signaling or indicated by the dynamic signaling. A primary anchor (e.g., first representative) CC can be configured by a BS for all CC groups. A secondary anchor (e.g., second representative) CC can be configured in each CC group (e.g., one or more particular CC groups). The DCI field configured for the anchor CC in the DCI can be independently configured by a BS. The DCI field of a secondary anchor CC can be shared for more than one CC in the CC group of the secondary anchor CC. Therefore, the transmissions in these CCs can be scheduled based on the DCI field of the secondary anchor CC. The DCI field of a primary anchor CC can be shared for more than one CC.

In some embodiments, a CC in a CC group can share the DCI field of more than one anchor CC. The CCs in the CC group may preferentially/selectively or be configured to share the DCI field of the secondary anchor CC of the CC group.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
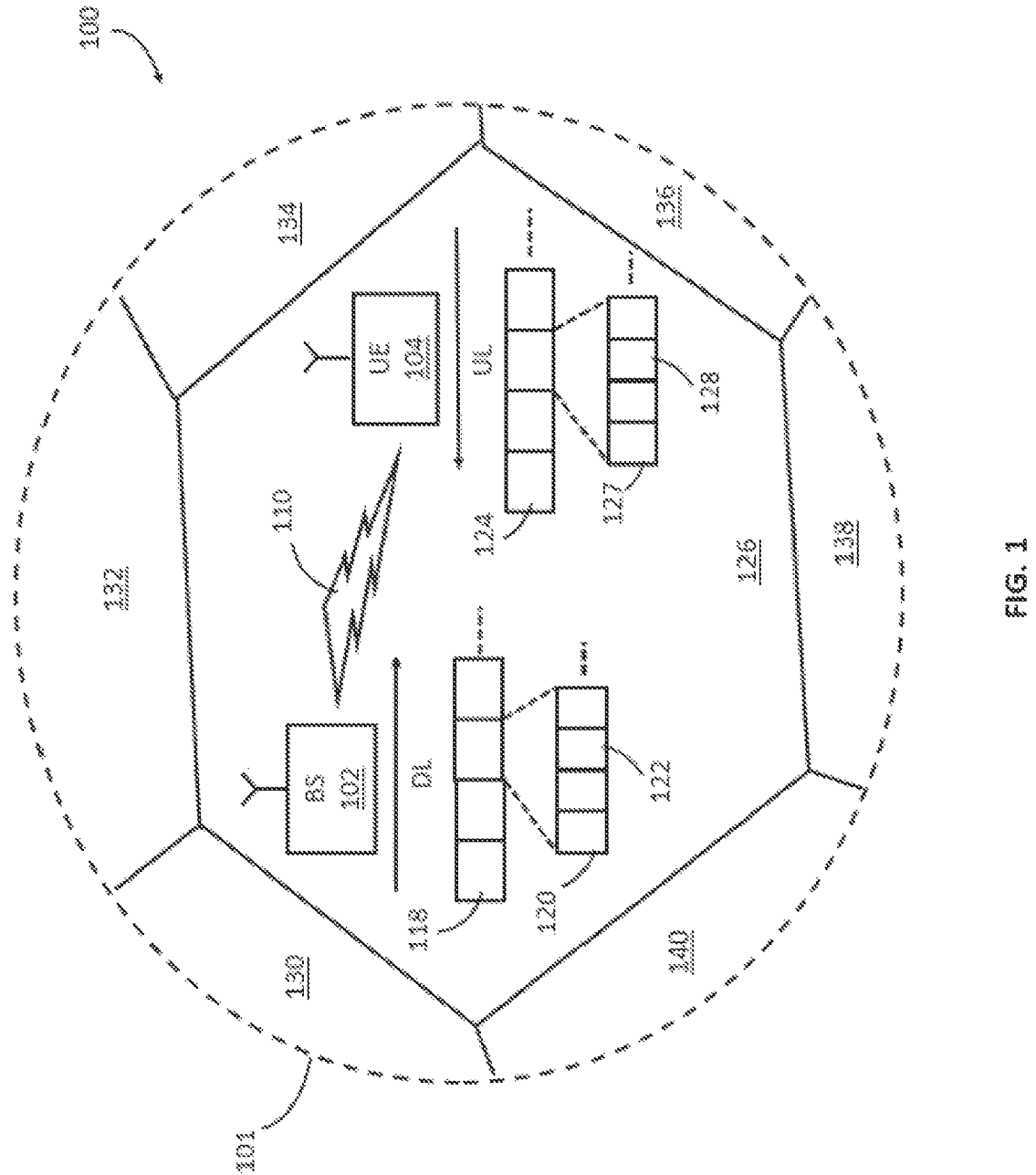
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
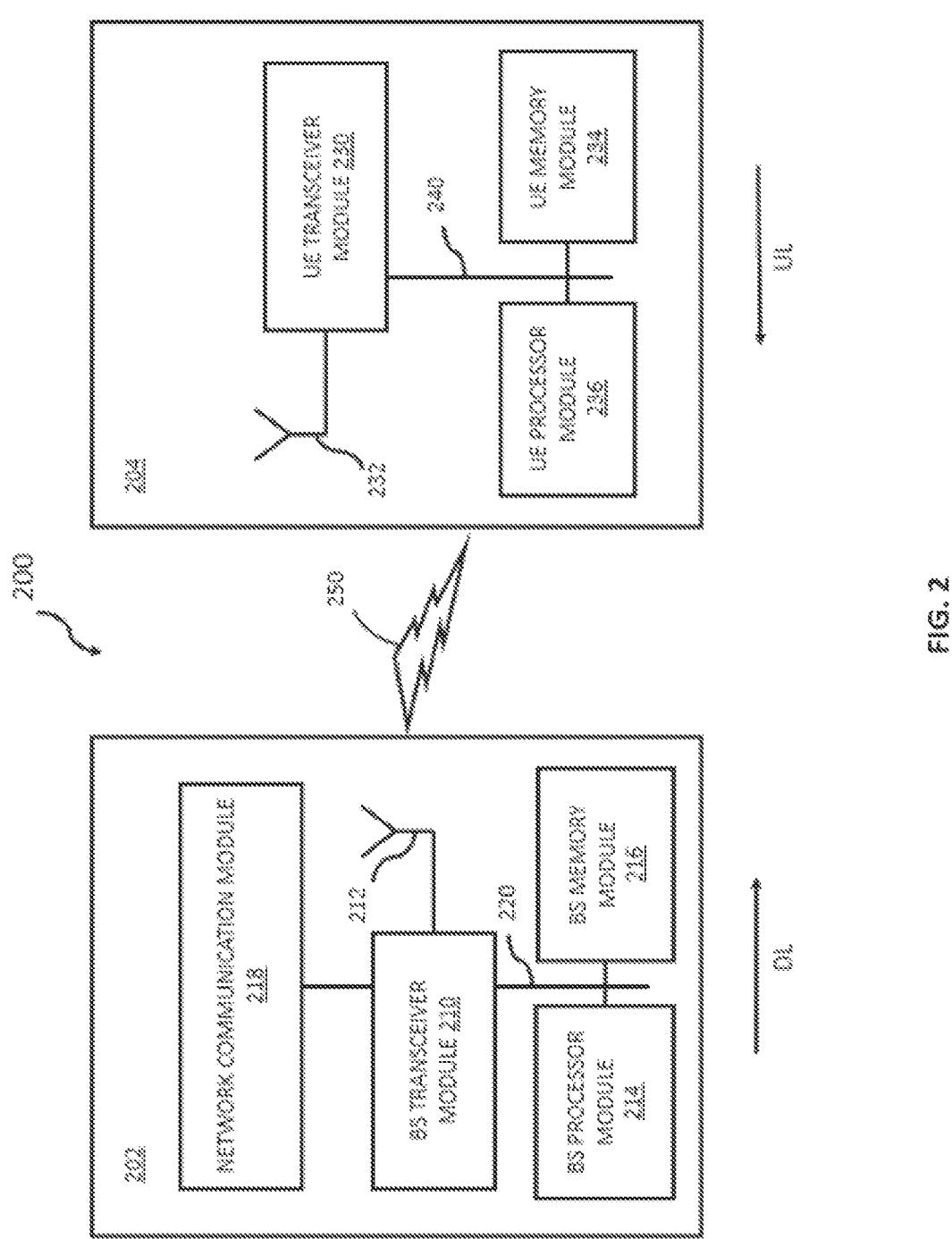
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistance (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for DCI Field Size Aligned in CC Group

In certain systems (e.g., 5G new radio (NR), Next Generation (NG) systems, 3GPP systems, and/or other systems), a carrier (e.g., component carrier (CC), cell) can include/contain/hold the scheduling of one or more physical downlink shared channels (PDSCHs) or physical uplink shared channels (PUSCHs). The PDSCH and/or the PUSCH may be referred to as signaling(s). These systems can support the scheduling of the transmissions in various CCs via multiple downlink control information (DCI). However, scheduling the PDSCHs or PUSCHs with multiple DCIs may increase the number of DCIs in the system cell, thereby causing congestion to the physical downlink control channel (PDCCH) that carries DCIs. Further, a single DCI of these systems may not be allowed to schedule multiple PDSCHs and/or PUSCHs on more than one carrier (e.g., CC, cell).

Hence, the systems and methods of the technical disclosure can provide a configuration discussed herein to support/enable/allow the scheduling of multiple PDSCHs or PUSCHs on more than one CC through a single DCI. By utilizing a single DCI for scheduling multiple transmissions, the systems and methods of the technical solution can minimize congestion to the PDDCH (e.g., minimize PDCCH blocking rate) by reducing the number of DCIs utilized for scheduling the multiple PDSCHs and/or PDSCHs. The systems and method can provide a DCI that schedules at PDSCHs and/or PUSCHs of multiple CCs which may belong to different transmission blocks (TB s) or the same TB, or one TB may be located in multiple CCs.

Further, due to the variations in channel quality between different CCs, among other scenarios, various systems can benefit from utilizing a single DCI to schedule multiple PDSCHs or PUSCHs for avoiding congestion to the PDCCH, reducing the blocking rate, reducing latency (e.g., scheduling latency), and/or decreasing resource consumption by utilizing a single DCI signaling to schedule multiple PDSCHs and/or PUSCHs. For example, when scheduled CCs belong to or are part of an intraband (e.g., the same or similar frequency band), the channel quality can be similar between the CCs. In this example, PDSCHs or PUSCHs on these CCs can share certain scheduling information in a single DCI. In another example, when one or more scheduled CCs belong to an interband (e.g., different frequency bands), the channel quality between individual CCs can vary, and the PDSCHs or PUSCHs on different bands may not share the scheduling information in the single DCI.

For proper configuration/setting of the scheduling information for individual CCs, the systems and methods can group and configure the CCs as discussed herein to utilize a single DCI for scheduling multiple CCs. Additionally, since the scheduling information are carried by bits of DCI field, to utilize a single DCI, the scheduling information for different CCs may require bits with different sizes (e.g., a different configuration of the DCI field). Therefore, the systems and methods discussed herein can further establish/configure the DCI with different DCI field sizes to support the communication between the UE 104 and the BS 102 (e.g., share the DCI bit of the same scheduling information between the UE 104 and the BS 102).

In various implementations discussed herein, a single DCI can schedule multiple transmissions on multiple CCs. At least one DCI field (or multiple DCI fields) of the single DCI can be shared for more than one transmission. Transmission types can include at least an uplink transmission (e.g., PUSCH) and/or downlink transmission (e.g., PDSCH).

In a one-scheduling-multiple downlink (DL) transmissions scenario, a BS 102 can send/provide/transmit/signal a single DCI to a UE 104, where the UE 104 can be scheduled to perform certain features. For example, responsive to or subsequent to receiving the configuration from the BS 102, the UE 104 can be scheduled to receive/obtain/fetch/acquire at least one PDSCH in at least one CC. In another example, the UE 104 can be scheduled to send at least one PUSCH in at least one CC. In further example, the UE 104 can be scheduled to send at least one PUSCH in at least one CC, and scheduled to receive at least one PDSCH in at least one CC. Various aspects/features/elements from various examples/passages disclosed herein can be combined and/or re-ordered, in accordance with the present inventive concepts, and are in no way limited by the examples described herein.

A. Example Implementation Aspects 1: Determine at Least One DCI Field Shared for More than One Transmission In some implementations, the BS 102 can configure/modify/update the configuration to indicate at least one DCI field that is shared by more than one transmission. Once configured, the BS 102 can send/provide/transmit the configuration to the UE 104. The UE 104 can receive the configuration and determine at least one DCI field that is shared for multiple transmissions, for instance, when a single DCI schedules multiple PDSCHs or PUSCHs on multiple CCs. One or more methods, features, or operations can be used to determine the DCI field that is shared for more than one transmission.

Example Method 1 of Example Implementation Aspects 1

At least one field set (e.g., each set can include one or more fields) can be configured by the BS 102 (e.g., gNB or wireless communication node) according to or based on RRC signaling (e.g., sent by the BS 102 to the UE 104 (e.g., wireless communication device)). The RRC signaling can identify the configured set of at least one field of the DCI signaling. Each field set can include/contain/hold at least one DCI field. The BS 102 may send a dynamic signaling (e.g., medium access control control element (MAC CE) signaling, among other DCI signalings) indicating a field set. The DCI field in the indicated field set can be shared for/by more than one transmission.

For example, the BS 102 can configure four field sets (e.g., '0111', '1000', etc.). Each field set can be represented by a bit in a bitmap. If the dynamic signaling with an index '0' is indicated for the UE 104 (e.g., the index representing which field set to be shared), the UE 104 can determine that DCI field(s) in the first field set (e.g., in the bit map '0111') can be shared for more than one transmission. Additionally or alternatively, if the index is '1' for bit map '1000', the UE 104 can determine the DCI field(s) in the first field set can be shared for more than one transmission. The BS 102 is not limited to configuring four field sets, and can configure other numbers of field sets, such as eight, ten, sixteen field sets, etc. The index can be configured by the BS 102 or based on the specification.

In another example, the BS 102 can configure one field set and the field containing four DCI fields (e.g., '0111', '1000', etc.). Each field within the field set can be represented by a bit in a bitmap. If the dynamic signaling with an index '0' is indicated for the UE 104 (e.g., the index representing which field to be shared), the UE 104 can determine that DCI field(s) in the first field (e.g., in the bit map '0111') can be shared for more than one transmission. Additionally or alternatively, if the index is '1' for bit map '1000', the UE 104 can determine the first DCI field(s) in the field set can be shared for more than one transmission. The BS 102 is not limited to configuring one field set, and can configure other numbers of field sets, such as four, eight, ten, sixteen field sets, etc. The index can be configured by the BS 102 or based on the specification.

Example Method 2 of Example Implementation Aspects 1

At least one DCI field can be configured by a BS 102 according to the RRC signaling. The BS 102 can send a dynamic signaling to the UE 104 indicating at least one DCI field that is shared for more than one transmission. For example, if the BS 102 configures four DCI fields, and a bitmap of '1001' is indicated for the UE 104 by a DCI, the first and last DCI fields can be shared for more than one transmission. In this case, the index can be configured as '1' (or '0' based on the configuration). Additionally or alternatively, if an opposite index value is set or configured (e.g., index of '0'), the second and third DCI fields can be shared.

Example Method 3 of Example Implementation Aspects 1

At least one DCI field can be predefined by a specification or a default configuration. The BS 102 can send a dynamic signaling indicating at least one DCI field that is shared for more than one transmission (e.g., similar to method 2 of example implementation aspects 1). For example, if the specification predefines or preconfigures four DCI fields, and the DCI indicates a bitmap of '1001' for the UE 104, the first and last DCI fields can be shared for more than one transmission.

Example Method 4 of Example Implementation Aspects 1

The BS 102 can configure at least one DCI field set according to or based on RRC signaling. Each field set can include/contain/have at least one DCI field. The DCI field configured by the BS 102 can be shared for more than one transmission. For example, if the BS 102 configures four DCI fields, then these four DCI fields can be shared for more than one transmission. As a result, in this method, the number of configured DCI fields can correspond to the number of DCI fields that can be shared.

Example Method 5 of Example Implementation Aspects 1

At least one DCI field set can be predefined/preconfigured by a specification or default configuration. The DCI field predefined by the specification can be shared for more than one transmission. For example, if the specification defines or configures four DCI fields, then these DCI fields can be shared for more than one transmission. As such, at least one of the methods of example implementation aspects 1 for one-scheduling-multiple transmission can be configured flexibly, thereby reducing DCI overhead and increasing the efficiency of using DCI bits (e.g., decrease or avoid network congestion).

B. Example Implementation Aspects 2: Determine a Configuration Method for a Single DCI to Schedule Multiple PDSCHs or PUSCHs on Multiple/Different CCs In various embodiments, the DCI field can be predefined/preconfigured by a specification or a default configuration, the DCI field can be configured by an RRC signaling, and/or the DCI field can be indicated by a dynamic signaling, among others. For example, if the BS 102 configures four DCI fields, and the DCI indicates a bitmap of '1001' for the UE 104, the first and last DCI fields can be shared for more than one transmission.

In some implementations, the specification, RRC signaling, and/or dynamic signaling (among others) can define/configure the CCs scheduled by the single DCI. In this case, for example, if the BS 102 configures four CCs for the UE 104, and the DCI indicates a bitmap of '1001' for the UE 104, then the first and last CCs may be scheduled by the single DCI. For the single DCI to schedule multiple PDSCHs and/or PUSCHs on multiple CCs, one or more configuration methods or operations can be utilized.

Example Method 1 of Example Implementation Aspects 2

The CCs scheduled by the single DCI can be divided into at least one CC group. The CCs of each group can be configured by the RRC signaling, and/or indicated/configured by a dynamic signaling. In this case, the BS 102 can send/provide/transmit an RRC signaling to configure CCs in each of the at least one CC group and/or send a dynamic signaling to indicate the CCs in each of the at least one CC group to the UE 104. For example, the BS 102 can configure a CC with index '0' and a CC with index l' to belong to a first CC group according to the RRC signaling.

At least one anchor (e.g., representative) CC can be configured in each CC group. The DCI field configured for the anchor CC (e.g., a first anchor CC) in the DCI can be independently configured by a BS 102. The DCI field (e.g., a first DCI field) of an anchor CC can be shared for more than one CC in the CC group of the anchor CC, therefore, the transmissions in these CCs can be scheduled based on the DCI field of the anchor CC (e.g., based on the first DCI field of the first anchor CC).

Example Method 2 of Example Implementation Aspects 2

The CCs scheduled by the single DCI can be divided into at least one CC group. The CCs contained in each group can be configured by the RRC signaling, and/or indicated by a dynamic signaling. For example, the BS 102 can configure a CC with index '0' and a CC with index l' to belong to, included in, or reside as a part of a first CC group according to the RRC signaling and/or the dynamic signaling. In some cases, the DCI field configured for each CC group in the DCI can be independently configured by the BS 102. In this case, one or more (or all) CCs in a CC group can share a set of DCI fields that can be shared for more than one transmission.

Example Method 3 of Example Implementation Aspects 2

The CCs scheduled by the single DCI can be divided into at least one CC group. The CC contained in each group can be configured by the RRC signaling, and/or indicated by a dynamic signaling. The RRC signaling and/or the dynamic signaling can be sent from the BS 102 to the UE 104. For example, the BS 102 can configure a CC with index '0' and a CC with index 1' to be a part of a first CC group according to the RRC signaling and/or the dynamic signaling.

In some cases, the BS 102 can configure one primary anchor CC (e.g., a first anchor CC) for all CC groups. The BS 102 can configure one secondary anchor CC (e.g., a second anchor CC) in each or at least one CC group. In this case, the DCI field configured for both primary anchor CC and secondary anchor CC in the single DCI can be independently configured by the BS 102. The DCI field of a secondary anchor CC can be shared for more than one CC in the respective CC group of the secondary anchor CC.

As a result, the transmissions (e.g., uplink and/or downlink transmissions) in these CCs can be scheduled based on the DCI field of the secondary anchor CC. The DCI field of the primary anchor CC can be shared for more than one CC of the CCs scheduled by the single DCI. Hence, the one or more configurations can enable/allow utilization of a single DCI to schedule multiple PDSCHs and/or PUSCHs, thereby providing increased flexibility of one-scheduling-multiple transmissions for reduction of DCI overhead and increased in the efficiency of using DCI bits.

C. Example Implementation Aspects 3: Determine Bit Size of at Least One DCI Field in a Single DCI Scheduling Multiple PDSCHs and/or PUSCHs on Multiple CCs In some implementations, one or more (or all) CCs in a CC group can share a set of DCI fields that can be shared for more than one transmission. To determine the bit size of the DCI field in the set, one or more of the following operations or methods can be utilized.

Example Method 1 of Example Implementation Aspects 3

An anchor CC can be configured/defined in a first CC group, where each bit size of the DCI field (can be shared for more than one transmission) can be determined according to or based on a bit field size of the anchor CC. For example, if the bit size of a frequency domain resource allocation (FDRA) (e.g., a certain DCI field) of the anchor CC configured by the BS 102 is 16 (e.g., the bit field size of the anchor CC is 16 bits), the bit size of FDRA (e.g., the bit size of the DCI field) of the first CC group can be 16. In this case, the bit size of the DCI field can correspond to the bit field size of the anchor CC.

Example Method 2 of Example Implementation Aspects 3

At least one anchor CC can be configured in a first CC group, where each DCI field size can be determined/configured based on or by the maximum bit size (e.g., highest bit size) of the DCI field corresponding to the anchor CCs. The DCI field can be shared for more than one transmission. For example, if the bit size of FDRA of the first anchor CC configured by the BS 102 is 16 bits, and the bit size of the FDRA of a second anchor CC (e.g., a secondary anchor) configured by the BS 102 is 8 bits, the bit size of the FDRA of the first CC group can be 16 bits, since the maximum bit size is 16 bits corresponding to the first anchor CC (e.g., 16 bits>8 bits).

Example Method 3 of Example Implementation Aspects 3

In certain implementations, one or more DCI field sizes can be determined by, based on, or according to the maximum bit size of the DCI field corresponding to each CC (e.g., each anchor CC) in a first CC group. The DCI field can be shared for more than one transmission. For example, the first CC group can include/contain a first CC and a second CC. If the bit size of FDRA of the first CC configured by the BS 102 is 16 bits and the bit size of FDRA of the second CC configured by the BS 102 is 8 bits, the bit size of FDRA of the first CC group can be 16 bits, which is the higher bit size of the CCs within the CC group.

Example Method 4 of Example Implementation Aspects 3

Each DCI field size can be configured by the BS 102 according to the RRC signaling. For example, in some cases, if the bit size of FDRA configured by the BS 102 is 16 bits and the bit size of time domain resource allocation (TDRA) (e.g., another DCI field) configured by the BS 102 is 8 bits.

D. Example Implementation Aspects 4: Determine the DCI Field Bit Size/Length in a Single DCI Scheduling Multiple PDSCHs or PUSCHs on Multiple CCs In various embodiments, at least one DCI field in the single DCI can be shared for at least one CC. Each DCI field shared for more than one transmission can correspond to a scheduled carrier (e.g., CC) in one of at least the following cases/scenarios/situations: the size of the shared DCI field may be larger than the actually required bit size of the scheduled CC; the size of the shared DCI field may be smaller than the actually required bit size of the scheduled CC; and/or the size of the shared DCI field may be equal to the actually required bit size of the scheduled CC. Therefore, one or more methods or operations can be used to determine the size or length of the DCI field bit in a single DCI for scheduling of multiple transmissions. The actually required bit size may refer to the actual bit size/length (or number of bits) of the DCI field corresponding to the scheduled CC, where the DCI field is in the DCI that is used to schedule the CC.

Example Method 1 of Example Implementation Aspects 4

In certain cases, the size of the shared DCI field may be greater/larger/more than the actually required bit size of the scheduled CC. In this case, the actually required bit size of the scheduled CC can be selected from the bits of the shared DCI field bit. For example, the size of a shared DCI field can be represented as 'm' and the required size bit of the scheduled CC can be represented as 'n', where m is greater than n (e.g., m>n). The first n bits of the shared DCI field can be selected for the scheduled CC. Alternatively, in another example, the last n bits of the shared DCI field may be selected for the scheduled CC.

Example Method 2 of Example Implementation Aspects 4

In some cases, the size of the shared DCI field may not be equal to the actually required bit size of the scheduled CC. In this case, the indicated objects (e.g., information indicated by the DCI domain) corresponding to the DCI field in the scheduled CC can be scaled based on a scaling factor. The scaling factor can be at least one of the following: m/n, $\lfloor m/n \rfloor \lceil m/n \rceil$, n/m, $\lfloor n/m \rfloor$, $\lceil n/m \rceil$. The 'm' can represent the size of the shared DCI field, and the 'n' can represent the actually required bit size of the scheduled CC.

For example, the size of the shared DCI field can be 5 bits, the actually required bit size of the scheduled CC can be 2 bits, the DCI field can be FDRA, and the scaling factor can be 2.5 (e.g., 5/2 based on at least one of the above scaling factors). Further, the indicated objects corresponding to the FDRA can be, for example, 20 resource blocks (RB s) (other numbers of RBs can correspond to the FDRA in other examples). As a result, the initial indication granularity can be 10 RBs (e.g., 20/2), and the current indication granularity can be 4 RBs (e.g., 10/2.5).

In another example, the size of the shared DCI field can be 2, the bit size of the actually required bit of the scheduled CC can be 5, the DCI field can be FDRA, and the scaling factor can be 0.4 (e.g., 2/5 based on at least one of the above scaling factor technique). With the indicated objects corresponding to the FDRA being 20 RBs, the initial indication granularity can be 2 RBs (e.g., 20/5), and the current indication granularity can be 5 RBs (e.g., 2/0.4).
Example Method 3 of Example Implementation Aspects 4

In certain implementations, the scaling factors may not be used. The size of the shared DCI field may not equal the actually required bit size of the scheduled CC. As such, the indicated objects corresponding to the DCI field in the scheduled CC may be scaled. The 'm' can represent the size of the shared DCI, and the 'n' can represent the actually required bit size of the scheduled CC.

For example, the size of the shared DCI field can be 5, the actually required bit size of the scheduled CC can be 2, and the DCI field can be FDRA. The indicated objects corresponding to the FDRA can be 20 RBs. As a result, the initial indication granularity can be 10 RBs (e.g., 20/2), and the current indication granularity can be 4 RBs (e.g., 20/5).

In another example, the size of the shared DCI field can be 2, the actually required bit size of the scheduled CC can be 5, and the DCI field can be FDRA. The indicated objects corresponding to the FDRA can be 20 RBs. As a result, for example, the initial indication granularity can be 2 RBs (e.g., 20/5), and the current indication granularity can be 10 RBs (e.g., 20/2). Accordingly, based on at least one of the example methods, among other operations, the BS 102 can send a configuration to the UE 104 for scheduling transmissions using the single DCI.

Figure 3:
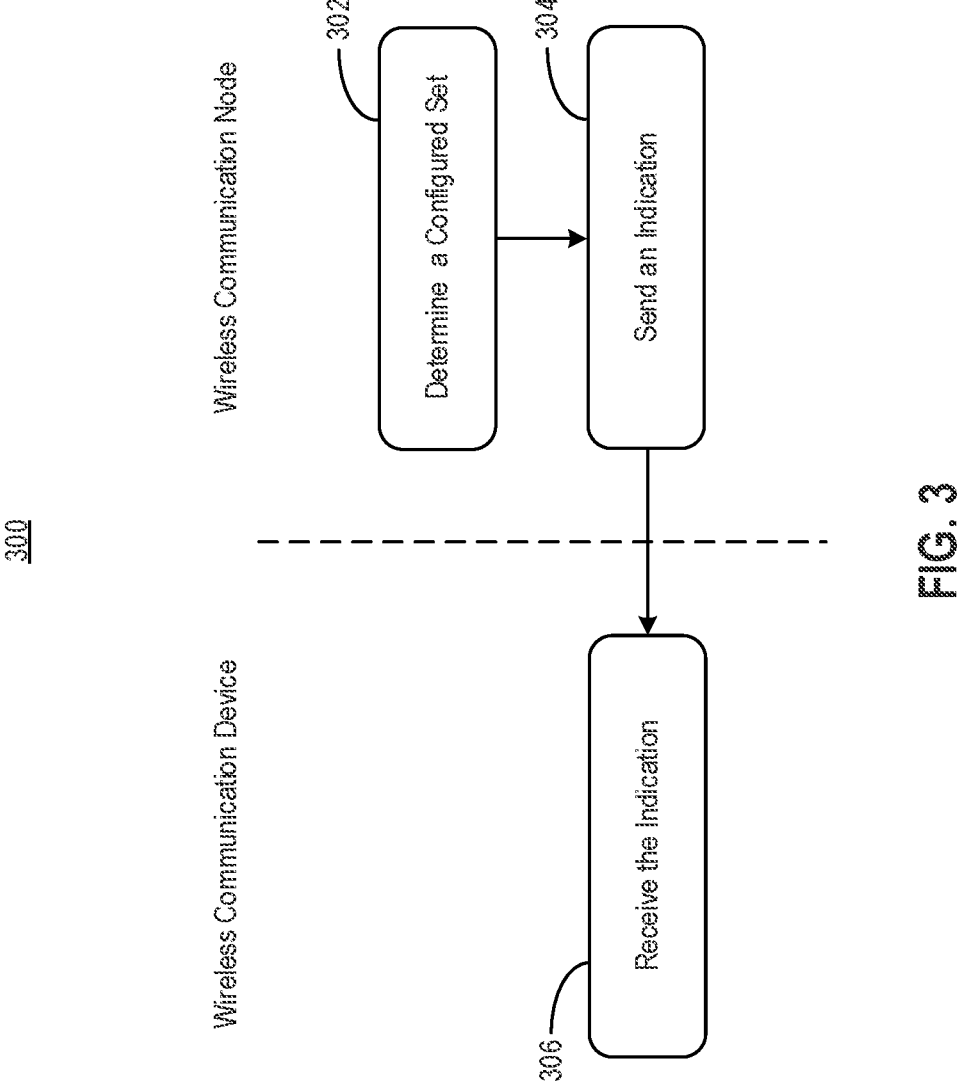
FIG. 3 illustrates a flow diagram of an example method for DCI field size aligned in CC group, in accordance with an embodiment of the present disclosure.

FIG. 3 illustrates a flow diagram of an example method 300 for DCI field size aligned in CC group. The method 300 can be implemented using any of the components and devices detailed herein in conjunction with FIGS. 1-2. In overview, the method 300 can include a wireless communication node determining a configured set (302). The method 300 can include the wireless communication node sending an indication to a wireless communication device (304). The method 300 can include the wireless communication device receiving the indication from the wireless communication node (306).

Referring to operation (302), the wireless communication node (e.g., BS or gNB) can send determine a configured set of at least one field of a downlink control information (DCI) signaling. The configured set can be shared by multiple transmissions (e.g., PUSCHs, PDSCHs, etc.), where the transmissions can be scheduled by the DCI signaling on multiple component carriers (CCs). The wireless communication node can configure the shared fields and/or determine the shared fields based on, according to, or predefined/ preconfigured by a specification or default configuration.

In some implementations, the wireless communication node may send a radio resource control (RRC) signaling identifying the configured set of at least one field of the DCI signaling to the wireless communication device. The wireless communication note can send the RRC signaling responsive to the configuration or determination of the configured set.

In some implementations, the multiple CCs can be configured by the wireless communication node. In some other implementations, the CCs can be preconfigured/predefined by the specification or default configuration. With the configured or predefined CCs, at least one of: the wireless communication node can send the RRC signaling identifying the CCs to the wireless communication device; or the wireless communication node can send the dynamic signaling to indicate the one or more CCs to the wireless communication device.

In various implementations, the configuration of the CCs can include dividing/separating/grouping/organizing the CCs into at least one CC group (e.g., the wireless communication node or the specification can divide the CCs). In this case, at least one of: the wireless communication node can send an RRC signaling to the wireless communication device to configure CCs in each of the at least one CC group; or the wireless communication node can send a dynamic signaling to indicate to the wireless communication device the CCs in each of the at least one CC group.

In some embodiments, at least one of: the multiple CCs can be divided into at least one CC group, the at least one anchor CC (e.g., representative CC of a respective CC group, such as a first anchor CC shared across different CC groups) can be configured in each of the at least one CC group, a first DCI field of a first anchor CC can be sharable by more than one CC in a CC group of the first anchor CC, and/or transmissions in the CCs of the CC group of the first anchor CC can be scheduled based on the first DCI field of the first anchor CC.

In certain cases, a CC in a CC group can share a DCI field of more than one anchor CC (e.g., a first and second anchor CCs) of the CC group. In some cases, a CC in a CC group can share a DCI field having a largest size (e.g., the largest number of bits or highest bit size) among DCI fields of one or more anchor CCs of the CC group. The bit size of the DCI fields of the one or more anchor CCs can be compared to determine the largest size in the respective CC group. In certain implementations, a CC in a CC group can share a DCI field having a largest size among DCI fields of CCs (e.g., anchor or non-anchor CCs) of the CC group. In some implementations, at least one of: a respective DCI field in the DCI signaling, configured for each of the at least one CC group, can be independently configured by the wireless communication node, or all CCs in a CC group of the at least one CC group can share a set of DCI fields that is sharable by more than one transmission.

In various implementations, at least one of: a primary anchor CC can be configured by the wireless communication node for all of the at least one CC groups, a secondary anchor CC can be configured in each of the at least one CC groups (e.g., selectively configured for at least one respective CC group), a respective DCI field in the DCI signaling, configured for each of the at least one CC group, can be independently configured by the wireless communication node, a DCI field of a secondary anchor CC can be sharable by more than one CC in a CC group of the secondary anchor CC, transmissions in the CCs of the CC group of the secondary anchor CC can be scheduled based on the DCI field of the secondary anchor CC, and/or a DCI field of the primary anchor CC can be sharable by more than one CC in a CC group (e.g., or all CC groups, where one CC in each CC group can share DCI field) of the primary anchor CC. In various embodiments, at least one of: a CC in a CC group of the at least one CC groups, can share a DCI field of more than one anchor CC of the CC group, or CCs in the CC group can preferentially or selectively share a DCI field of the secondary anchor CC of the CC group.

Referring to operation (304), the wireless communication node can send/provide/transmit/signal an indication of one or more fields from the configured set to the wireless communication device (e.g., UE) via a dynamic signaling. The dynamic signaling can include/comprise at least one of a medium access control control element (MAC CE) signaling or another DCI signaling. The wireless communication node can send the indication responsive to or subsequent to the configuration or determination of the configured set. For instance, the configured set can be configured/defined/established by the wireless communication node, or may be predefined by a specification or a default configuration.

Referring to operation (306), the wireless communication device can receive/obtain/acquire the indication of the one or more fields (e.g., DCI fields) from a configured set from the wireless communication node. The configured set can include/have/contain at least one field of the DCI signaling. The at least one field of the DCI signaling can be shared by various transmissions (e.g., PUSCHs and/or PDSCHs, etc.). The transmissions can be scheduled by the DCI signaling on multiple CCs.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
determining, by a wireless communication node, a configured set comprising one or more fields of a downlink control information (DCI) signaling, the one or more fields to be shared by a plurality of transmissions that are scheduled on a plurality of component carriers (CCs) by the DCI signaling; and
sending, by the wireless communication node to a wireless communication device via a dynamic signaling, an indication comprising a bitmap or index identifying the one or more fields of the DCI signaling from the configured set to be shared by the plurality of transmissions scheduled on the plurality of CCs.

2. The method of claim 1, wherein the configured set is configured by the wireless communication node, or is predefined by a specification.

3. The method of claim 1, comprising:
sending, by the wireless communication node to the wireless communication device, a radio resource control (RRC) signaling identifying the configured set.

4. The method of claim 1, wherein the dynamic signaling comprises a medium access control control element (MAC CE) signaling or another DCI signaling.

5. The method of claim 1, wherein the plurality of CCs is configured by the wireless communication node, or is predefined by a specification.

6. The method of claim 5, comprising at least one of:
sending, by the wireless communication node to the wireless communication device, a radio resource control (RRC) signaling identifying the plurality of CCs; or
sending, by the wireless communication node to the wireless communication device, a dynamic signaling to indicate one or more of the plurality of CCs.

7. The method of claim 5, wherein the plurality of CCs are divided into at least one CC group, the method comprising at least one of:
sending, by the wireless communication node to the wireless communication device, a radio resource control (RRC) signaling to configure CCs in each of the at least one CC group; or
sending, by the wireless communication node to the wireless communication device, a dynamic signaling to indicate the CCs in each of the at least one CC group.

8. The method of claim 5, wherein at least one of:
the plurality of CCs are divided into at least one CC group,
at least one anchor CC is configured in each of the at least one CC group,
a first DCI field of a first anchor CC is sharable by more than one CC in a CC group of the first anchor CC, or
transmissions in the CCs of the CC group of the first anchor CC are scheduled based on the first DCI field of the first anchor CC.

9. The method of claim 8, wherein a CC in a CC group shares a DCI field of more than one anchor CC of the CC group.

10. The method of claim 8, wherein a CC in a CC group shares a DCI field having a largest size among DCI fields of one or more anchor CCs of the CC group.

11. The method of claim 7, wherein a CC in a CC group shares a DCI field having a largest size among DCI fields of CCs of the CC group.

12. The method of claim 7, wherein at least one of:
a respective DCI field in the DCI signaling, configured for each of the at least one CC group, is independently configured by the wireless communication node, or
all CCs in a CC group of the at least one CC group share a set of DCI fields that is sharable by more than one transmission.

13. The method of claim 7, wherein at least one of:
a primary anchor CC is configured by the wireless communication node for all of the at least one CC group,
a secondary anchor CC is configured in each of the at least one CC group,
a respective DCI field in the DCI signaling, configured for each of the at least one CC group, is independently configured by the wireless communication node,
a DCI field of a secondary anchor CC is sharable by more than one CC in a CC group of the secondary anchor CC,
transmissions in the CCs of the CC group of the secondary anchor CC are scheduled based on the DCI field of the secondary anchor CC, or
a DCI field of the primary anchor CC is sharable by more than one CC in a CC group of the primary anchor CC.

14. The method of claim 13, wherein at least one of:
a CC in a CC group of the at least one CC group, shares a DCI field of more than one anchor CC of the CC group, or
CCs in the CC group preferentially share a DCI field of the secondary anchor CC of the CC group.

15. A method comprising:
receiving, by a wireless communication device from a wireless communication node, an indication comprising a bitmap or index identifying one or more fields of a downlink control information (DCI) signaling from a configured set to be shared by a plurality of transmissions scheduled on a plurality of component carriers (CCs),
wherein the configured set comprises the one or more fields of the DCI signaling, the one or more fields to be shared by the plurality of transmissions that are scheduled on the plurality of CCs by the DCI signaling.

16. A wireless communication device, comprising:
at least one processor configured to:
receive, via a receiver from a wireless communication node, an indication comprising a bitmap or index identifying one or more fields of a downlink control information (DCI) signaling from a configured set to be shared by a plurality of transmissions scheduled on a plurality of component carriers (CCs),
wherein the configured set comprises the one or more fields of the DCI signaling, the one or more fields to be shared by the plurality of transmissions that are scheduled on the plurality of CCs by the DCI signaling.

17. A wireless communication node, comprising:
at least one processor configured to:
determine a configured set comprising one or more fields of a downlink control information (DCI) signaling, the one or more fields to be shared by a plurality of transmissions that are scheduled on a plurality of component carriers (CCs) by the DCI signaling; and send, via a transmitter to a wireless communication device via a dynamic signaling, an indication comprising a bitmap or index identifying the one or more fields of the DCI signaling from the configured set to be shared by the plurality of transmissions scheduled on the plurality of CCs.

18. The wireless communication node of claim 17, wherein the configured set is configured by the wireless communication node, or is predefined by a specification.

19. The wireless communication node of claim 17, wherein the at least one processor is configured to:

send, via the transmitter to the wireless communication device, a radio resource control (RRC) signaling identifying the configured set.

20. The wireless communication node of claim 17, wherein the dynamic signaling comprises a medium access control control element (MAC CE) signaling or another DCI signaling.

\* \* \* \* \*